United States Patent [19]

Cross, Jr. et al.

[11] 4,056,748
[45] Nov. 1, 1977

[54] MAGNETIC SPEED PICKUP

[75] Inventors: Robert L. Cross, Jr., West Newton; M. Raymond Hill, North Huntingdon Township, Westmoreland County; Fred Tucker, Jeannette, all of Pa.

[73] Assignee: Carrier Corporation, Syracuse, N.Y.

[21] Appl. No.: 619,745

[22] Filed: Oct. 6, 1975

[51] Int. Cl.² ............................................. H02K 19/20
[52] U.S. Cl. ...................................... 310/168; 415/30; 416/61
[58] Field of Search ............................... 310/168–170, 310/74, 75, 80, 79, 62, 42, 322/29, 31, 75, 47; 415/17, 30; 416/61, 244 A

[56] References Cited
U.S. PATENT DOCUMENTS

| 3,132,337 | 5/1964 | Martin | 310/170 |
|---|---|---|---|
| 3,541,369 | 11/1970 | Murakami | 310/168 |
| 3,646,377 | 2/1972 | Cavil | 310/168 |
| 3,652,887 | 3/1972 | Taubitz | 310/168 |
| 3,882,335 | 5/1975 | Fries | 310/62 |
| 3,910,386 | 10/1975 | Stigall | 310/168 |
| 3,911,301 | 10/1975 | Riley | 310/168 |
| 3,944,863 | 3/1976 | Apsit | 310/168 |

Primary Examiner—R. Skudy
Attorney, Agent, or Firm—J. Raymond Curtin

[57] ABSTRACT

A magnetic pickup for sensing the speed of a rotor disc having a nosepiece affixed to the disc containing one or more magnets. The magnets are contained within blind openings passing inwardly from the back of the nosepiece and arranged to position the magnets within an embossed section extending axially from the outer surface thereof. A stationary sensing probe is mounted adjacent to the embossed section which is capable of generating a voltage signal as the magnets are passed in close proximity with the sensing element.

9 Claims, 2 Drawing Figures

MAGNETIC SPEED PICKUP

BACKGROUND OF THE INVENTION

This invention relates to a magnetic pickup and, in particular, to a magnetic pickup for sensing the speed of a rotor disc as utilized in a turbine or a compressor.

One prevalent method of sensing the speed of a rotating wheel in a rotary machine involves the use of a mask which is carried upon or affixed to the rotor wheel. The mask generally is formed of a nonmagnetic material and contains a series of permeable islands situated within the mask. The mask is passed through a stationary flux field established adjacent to the masked region whereby a voltage signal is generated as the permeable sites are passed therethrough. The voltage signals generated are then counted and converted to an output indicative of the rotor disc speed. Although this type of speed sensing device has proven to operate quite satisfactorily, its implementation has proven to be relatively expensive.

Magnetic speed pickup devices have also been developed which utilize a moving magnet, or series or magnets, which are carried or otherwise affixed to the rotating disc. The magnetic flux fields generated by these magnets extend outwardly from the wheel and are brought into communication with a transducer mounted adjacent the wheel. A signal is thus generated which is indicative of the rotor speed. In this arrangement, the relatively expensive mask is eliminated. Heretofore, the moving magnets have generally been secured to the rotating wheel by cementing the magnets in position using an epoxy resin, or the like. It has been found that with usage, the cement bond can fail, thereby allowing the magnets to fall into the moving machine components. This, in turn, can cause severe damage and/or produce an imbalance in the rotor system.

SUMMARY OF THE INVENTION

It is therefore an object of the present invention to improve magnetic pickup devices as employed in rotary machines.

A further object of the present invention is to provide a magnetic pickup device which can be secured to a rotating disc in a manner to prevent the magnets from escaping therefrom.

These and other objects of the present invention are attained by means of a nosepiece adapted to be secured upon a shaft-mounted rotating disc or impeller within a rotary machine, the nosepiece having an axially extended embossed section located upon an outer radially extended surface thereof, one or more magnets are positioned in blind holes passing through the backside of the nosepiece and which extend into the embossed section, means to secure the magnets within the blind openings within the embossed section to establish flux fields extending outwardly from the embossment, and a stationary sensing element positioned adjacent to the embossed section in communication with the flux fields whereby a signal is generated as the magnets pass in close proximity therewith.

BRIEF DESCRIPTION OF THE DRAWING

For a better understanding of the present invention, as well as other objects and further features thereof, reference is had to the following detailed description of the invention to be read in connection with the accompanying drawing, wherein.

DESCRIPTION OF THE PREFERRED EMBODIMENT

Figures 1, 2:
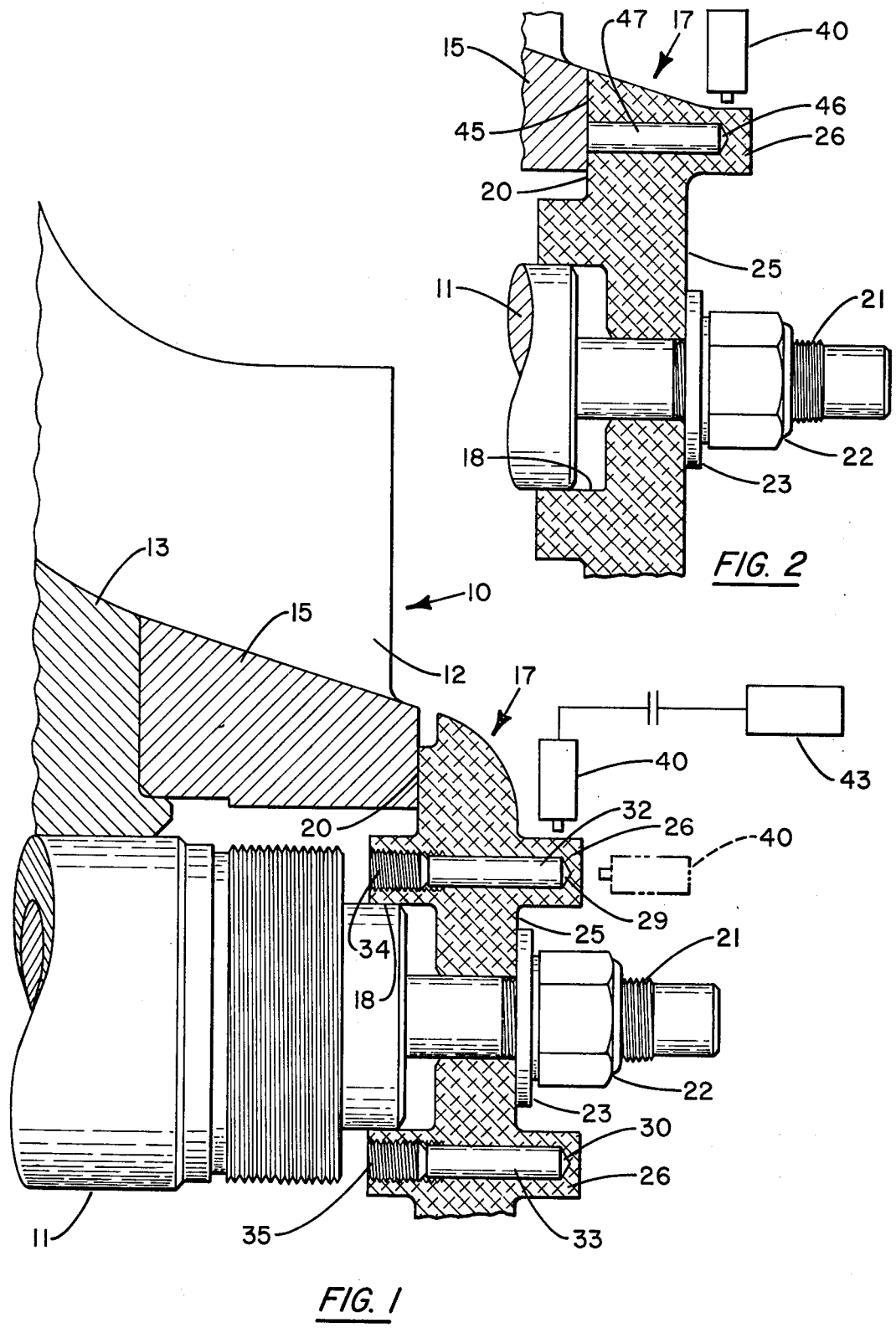
FIG. 1 is a partial side view in section illustrating a magnetic pickup device embodying the present invention secured to the impeller of a rotary machine.
FIG. 2 is a partial side view in section showing a second embodiment of the present invention.

Referring first to FIG. 1, there is illustrated, for explanatory purposes, an impeller 10 of a centrifugal compressor which is mounted in a conventional manner upon the shaft 11 of the machine. It should be understood that the present invention is not necessarily limited in its application to use in a centrifugal compressor and can be utilized in conjunction with any type of rotary machine having a shaft-mounted rotor wheel. As is conventional in the art, the impeller consists of a series of radially extended blades 12 which are affixed to the impeller hub 13, as for instance by welding or the like. At the inlet to the blade passages is positioned an inducer 15 which forms a part of the hub and serves, among other things, to establish the initial flow passage for directing working fluids through the impeller blade passages.

A generally annular housing or nosepiece 17 is slidably received upon the shaft by means of a counter-bored opening 18 formed in the backside thereof. A radially extended working surface 20 is machined upon the backside of the nosepiece which seats in contact against the end face of the inducer section. A threaded shank 21, carried by the shaft, passes through a centrally located hole in the nosepiece, the shank having a lock nut 22 and washer 23 thereon by which the working surface of the nosepiece is clamped or locked against the inducer section of the impeller. The outside diameter of the nosepiece is contoured to complement the inducer passage thus facilitating the movement of fluids therethrough. Similarly, to further facilitate the flow of fluids through the impeller, the outside diameter of the nosepiece preferably is equal to or slightly less than the entrance diameter to the inducer passage.

The outside radially extended surface 25 of the nosepiece is provided with an annular embossed section 26 extending outwardly in an axial direction therefrom. As illustrated, a pair of blind openings 29, 30 are machined from the backside of the nosepiece into the embossed section. Magnets 32, 33 are positioned within the blind openings and held in position by means of set screws 34, 35 threaded into the openings. The set screws serve to support the magnets against the terminal end wall of each blind opening thereby insuring that the magnets are properly positioned beneath the embossed section. In practice, the nosepiece, or alternatively, at least the embossed section, is fabricated of a nonpermeable material, such as aluminum or the like, whereby the magnetic flux field generated by each magnet is capable of freely passing therethrough into the region directly adjacent to the nosepiece.

A stationary detecting means 40, such as a transducer, is mounted adjacent to the embossed section with the sensing element thereof positioned to communicate with the magnetic flux fields generated by the magnets. As the flux fields are rotated beneath the transducer, a voltage signal is generated which is passed to a remote counter 43, capable of converting the voltage signals into a speed indicative output. Because of the particular arrangement of the extended embossment, the detecting means 40 can be located at any convenient location adjacent to the nosepiece, as for example the position indicated in dotted in FIG. 1.

Referring now to FIG. 2, there is illustrated a second embodiment of the present invention in which the embossed section 26 is positioned directly opposite the contact region 45 maintained between the inducer 15 and the working surface 20 of the nosepiece. Blind holes 46 are bored or otherwise formed inwardly from the working surface within the contact region so as to extend axially into the embossed section. Magnets 47, having a length substantially equal to the length of the holes, are then positioned within the holes. As can be seen, when the nosepiece is mounted against the impeller and locked in place, the magnets are prevented from working loose by the inducer hub, while at the same time being maintained in a position to direct their flux fields at the detecting means 40.

Although two magnets are utilized in the embodiment herein described, it should be understood that any number of magnets may be utilized and that any other modifications and changes can be made which come within the scope of the following claims.

What is claimed is:

1. A magnetic pickup for sensing the speed of a wheel mounted upon a rotor shaft including
    a generally annular nosepiece having two radially opposed surfaces comprising a working surface on the backside thereof and an outer surface, the nosepiece being slidably mounted upon the rotor shaft with the working surface positioned against the end face of the wheel,
    an embossed section axially extended from the opposed surface of the nosepiece,
    at least one magnet mounted within an axially aligned blind opening passing from the backside of the nosepiece into the embossed section,
    a plug secured within the opening for positioning the magnet within the embossed section and preventing the magnet from escaping from the opening,
    means operatively associated with the shaft for securing the working surface of the nosepiece against the wheel whereby the nosepiece moves with the wheel, and
    stationary detecting means positioned adjacent the embossed section for sensing the passage of the magnet therebeneath.

2. The magnet pickup of claim 1 wherein the embossed section is formed of a nonpermeable material.

3. The magnetic pickup of claim 2 wherein the embossed section includes a plurality of magnets passing therein.

4. The magnetic pickup of claim 3 further including a counter operatively connected to said detecting means.

5. A magnetic pickup for sensing the speed of an impeller rotatably supported upon the shaft of a rotary machine including
    a generally annular nosepiece having two radially opposed side wall surfaces comprising a working surface on the backside thereof and an opposed surface, the nosepiece being slidably mounted upon the rotor shaft with the working surface positioned against the hub of the impeller,
    an embossed section axially extending from said opposite surface of the nosepiece in axial alignment with the contact region between the working surface and the hub,
    at least one magnet contained within a blind opening passing inwardly from the working surface within the contact region and extending into the embossed section, the magnet being of a length substantially equal to that of the blind opening,
    means operatively associated with the shaft for securing the working surface of the nosepiece against the hub of the impeller thereby preventing the magnet from passing out of the opening, and
    stationary detecting means positioned adjacent the embossed section for sensing the passage of the magnet therebeneath.

6. The magnetic pickup of claim 5 wherein the nosepiece is contoured to complement the fluid intake to the impeller.

7. The magnetic pickup of claim 6 wherein the outside diameter of the nosepiece is equal to or less than the inside diameter of the fluid intake to the impeller.

8. The magnetic pickup of claim 5 wherein the nosepiece is fabricated of a nonpermeable material.

9. The magnetic pickup of claim 8 wherein a plurality of magnets are positioned within the embossed section.

* * * * *